(12) United States Patent
Nellikar et al.

(10) Patent No.: US 9,288,162 B2
(45) Date of Patent: Mar. 15, 2016

(54) ADAPTIVE INFRASTRUCTURE FOR DISTRIBUTED VIRTUAL SWITCH

(75) Inventors: Suraj Nellikar, Santa Clara, CA (US); Maithili Narasimha, Sunnyvale, CA (US); Anuraag Mittal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 91 days.

(21) Appl. No.: 13/566,030

(22) Filed: Aug. 3, 2012

(65) Prior Publication Data

US 2014/0036730 A1    Feb. 6, 2014

(51) Int. Cl.
*G06F 21/00*    (2013.01)
*H04L 12/931*   (2013.01)

(52) U.S. Cl.
CPC ................................ *H04L 49/70* (2013.01)

(58) Field of Classification Search
CPC ......... H04L 45/02; H04L 41/12; H04L 45/00; H04L 45/04; H04L 43/12
USPC ......................................... 370/255, 254, 351
See application file for complete search history.

(56) References Cited

U.S. PATENT DOCUMENTS

| | | | |
|---|---|---|---|
| 7,389,358 B1 | 6/2008 | Matthews et al. | |
| 8,180,734 B1 * | 5/2012 | Thilmony | G06F 11/1461 707/640 |
| 2006/0018481 A1 * | 1/2006 | Nagano | H04L 9/3271 380/270 |
| 2009/0043823 A1 * | 2/2009 | Iftode et al. | 707/200 |
| 2010/0202298 A1 * | 8/2010 | Agarwal | H04L 41/12 370/252 |
| 2010/0214949 A1 * | 8/2010 | Smith et al. | 370/254 |
| 2010/0257263 A1 | 10/2010 | Casado et al. | |
| 2012/0096159 A1 * | 4/2012 | Short | H04L 63/08 709/225 |
| 2012/0131662 A1 * | 5/2012 | Kuik | G06F 9/45558 726/11 |
| 2013/0080638 A1 * | 3/2013 | Di Benedetto | H04L 47/70 709/226 |
| 2013/0195113 A1 * | 8/2013 | Kotha | H04L 45/64 370/401 |

OTHER PUBLICATIONS

IBM Systems and Technology: "IBM VMready", Oct. 31, 2011.
IETF RFC 1876, C. Davis et al., "A Means for Expressing Location Information in the Do", Jan. 1996.

* cited by examiner

*Primary Examiner* — Andrew Lai
*Assistant Examiner* — Zhiren Qin
(74) *Attorney, Agent, or Firm* — Cindy Kaplan

(57) ABSTRACT

In one embodiment, a method includes identifying at a network device, characteristics of a distributed virtual switch comprising a control plane component and a plurality of data plane components, grouping the data plane components, and adapting operation of the distributed virtual switch for one or more groups of the data plane components based on the characteristics. An apparatus and logic are also disclosed herein.

20 Claims, 5 Drawing Sheets

ADAPTIVE INFRASTRUCTURE FOR DISTRIBUTED VIRTUAL SWITCH

TECHNICAL FIELD

The present disclosure relates generally to communication networks, and more particularly, to virtual switches.

BACKGROUND

Virtualization is a technology that allows one computer to do the job of multiple computers by sharing resources of a single computer across multiple systems. Through the use of virtualization, multiple operating systems and applications can run on the same computer at the same time, thereby increasing utilization and flexibility of hardware. Virtualization allows servers to be decoupled from underlying hardware, thus resulting in multiple virtual machines sharing the same physical server hardware. Virtual switches provide network connectivity between the virtual machines and physical ports on the servers. A distributed virtual switch may be deployed in many different network settings. For example, the distributed virtual switch may operate across different physical locations, at a central location and remote office/branch office, in hybrid clouds, or across layer 2 or layer 3 domains. Since network connectivity and other attributes may vary in each deployment, different behavior is desired among components of the distributed virtual switch.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
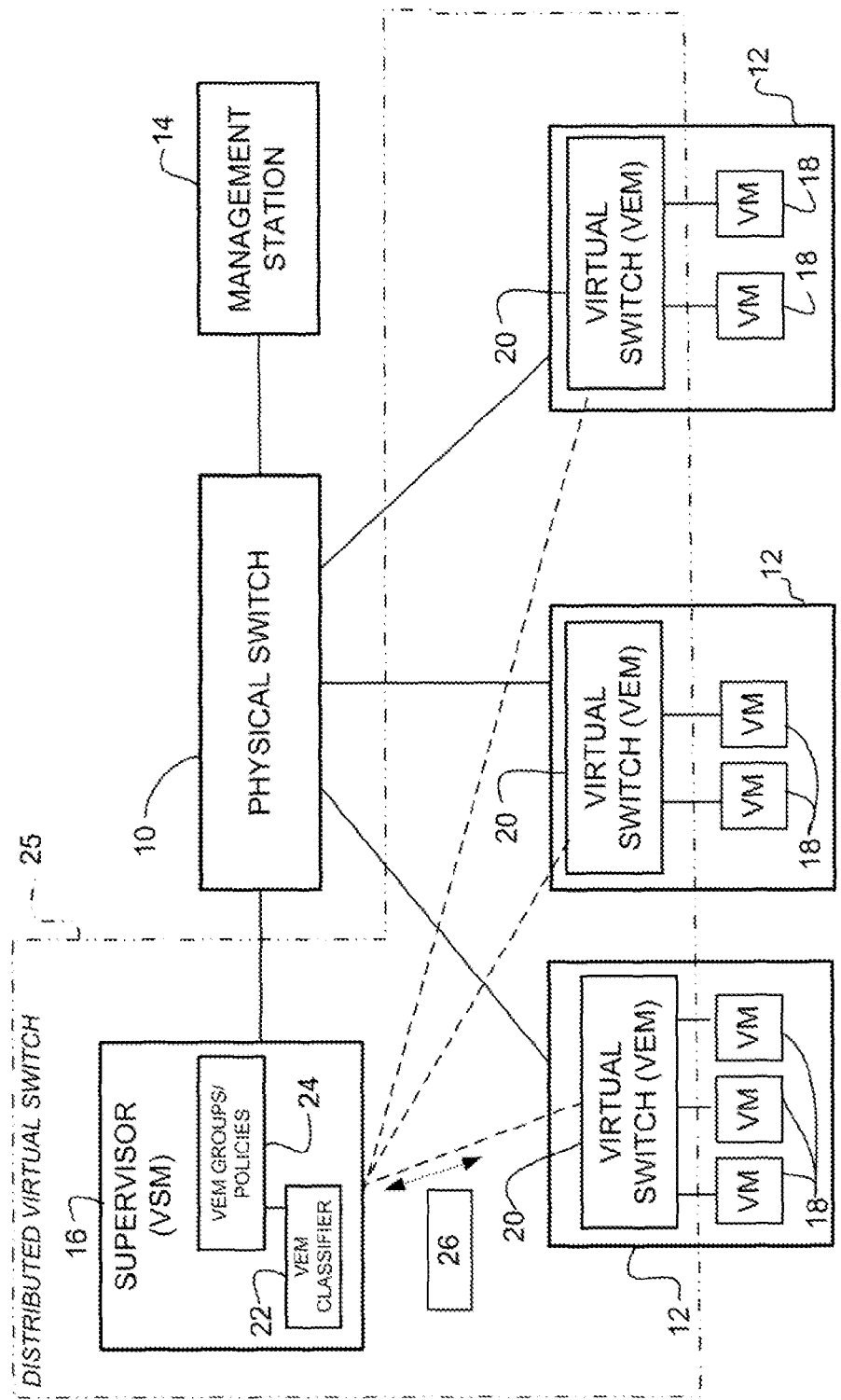
FIG. 1 illustrates an example of a network in which embodiments described herein may be implemented.

In one embodiment, a method generally comprises identifying at a network device, characteristics of a distributed virtual switch comprising a control plane component and a plurality of data plane components, grouping the data plane components, and adapting operation of the distributed virtual switch for one or more groups of the data plane components based on the characteristics.

In another embodiment, an apparatus generally comprises a processor for identifying characteristics of a distributed virtual switch comprising a control plane component and a plurality of data plane components, grouping the data plane components, and adapting operation of the distributed virtual switch for one or more groups of the data plane components based on the characteristics. The apparatus further comprises memory for storing a policy defining the operation for each of the data plane component groups.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In a virtual environment, virtual switches provide network connectivity between virtual machine interfaces and physical interfaces on servers. The virtual switch may operate as a distributed virtual switch with a data plane component installed on one or more servers and a supervisor (control plane component) hosted on a different server or appliance in a data center reachable over a layer 2 (L2) or layer 3 (L3) network. The distributed virtual switch may be deployed in many different environments including, for example, split across two physical locations over a data center interconnect extending over a layer 2 domain, a remote office/branch office (ROBO) comprising one or more data planes and a central location running the supervisor managing the data planes, hybrid clouds, or using virtual extensible local area network segments (VXLANs) with the data planes spread across racks in the data center, which may be layer 3 hops away from one another and the supervisor. Each of these distributed virtual switch deployments has different bandwidth, connectivity, and other network properties that result in different communication needs between the control plane and data plane components.

In one example, the control plane and data plane components of the distributed virtual switch exchange messages to detect a loss in connectivity and other functionality. These messages along with configuration events between the components may be run on fixed timers, which have maximum latency bounds. This works well in environments such as a data center where latency and other parameters are within set limits, however, this breaks down in other environments. For example, in the remote office/branch office case, upstream network connectivity from the remote office may be a DSL (digital subscriber line)/cable connection, which may be unreliable as compared to a single layer 2 domain within the data center. Since different offices may have different network connectivity, a single solution does not work for all. In another example, a hybrid cloud may include a data plane residing in the public cloud, which may be physically far from the enterprise location at which the supervisor is located.

The embodiments described herein provide an adaptive and flexible infrastructure for a distributed virtual switch and its components by providing location and context awareness to enable the distributed virtual switch to operate seamlessly in various deployment scenarios. Behavior of the distributed virtual switch components may be adapted based on bandwidth, location, network connectivity, or any combination of these or other characteristics, which are periodically calculated or discovered on the virtual switch components. The embodiments allow the distributed virtual switch to make intelligent decisions with respect to differentiating the behavior of not only the switch components but also various features as well as services running on the virtual switch in different deployment models. The embodiments provide improvements in adaptability, scalability, and reliability.

Referring now to the drawings, and first to FIG. 1, an example of a network in which embodiments described herein may be implemented is shown. For simplification, only a small number of nodes are shown. The network includes a physical switch 10 in communication with servers (host, physical machine) 12, management station 14, and supervisor 16 (e.g., Virtual Supervisor Module (VSM)), referred to herein as a control plane component. The management station 14 may be, for example, a virtualization management platform such as VMware Virtual Center management station, available from VMware of Palo Alto, Calif. or any other management device. The supervisor 16 may be located in a physical appliance or server in communication with the servers 12 and management station 14 via physical switch 10, or the VSM may be a virtual appliance (e.g., virtual machine) installed at one of the servers 12 or another server or network device.

Each server 12 comprises a virtual switch 20 (e.g., Virtual Ethernet Module (VEM)), referred to herein as a data plane component, and one or more virtual machines 18. A virtual machine monitor such as hypervisor (not shown) dynamically allocates hardware resources to the virtual machines 18. The virtual machines 18 may be moved (also referred to as vMotion, live migration, or virtual machine migration) between servers 12 and across layer 2 or layer 3 boundaries, based on traffic patterns, hardware resources, network services, or other criteria.

The virtual machines 18 are in communication with the virtual switch 20 via virtual network interface cards that connect to a virtual Ethernet interface at the virtual switch. The server 12 includes an Ethernet port for each physical network interface card. The Ethernet ports may be aggregated at a port channel. The virtual switches 20 are in communication with the network via the physical Ethernet interfaces. The virtual switch 20 switches traffic between the virtual machines 18 and the physical network interface cards. Each virtual machine 18 is associated with one or more virtual interface and each physical server 12 is associated with one or more physical interface.

In one embodiment, the virtual switches 20 are part of a distributed virtual switch residing in the physical hosts 12 hosting the virtual machines 18. As shown in FIG. 1, the distributed virtual switch 25 includes the virtual switches (VEMs) 20 installed at the servers 12 and the virtual supervisor module 16. The VSM 16 is configured to provide control plane functionality for the virtual machines 18. The virtual switch 20 provides switching capability at the server 12 and operates as a data plane associated with the control plane of the VSM 16. The VSM 16 and virtual switches (VEMs) 20 operate together to form the distributed virtual switch 25 as viewed by the management station 14. It is to be understood that the distributed virtual switch 25 shown in FIG. 1 is only an example and that other virtualization systems having different configurations or components may be used, without departing from the scope of the embodiments.

The supervisor 16 communicates with the virtual switches 20 via control and data packets 26. Control packets carry low level messages to ensure proper configuration of VEMs 20. The control messages may include, for example, heartbeat or handshake messages exchanged between the VSM 16 and VEMs 20. Data packets may be used to transmit NetFlow or other data. Metrics used to classify the VEMs 20 (described below) may be exchanged using the heartbeat/handshake messages.

Based on metrics discovered or calculated for each VEM 20 (e.g., network location, configuration, physical location) the VEMs are classified by VEM classifier 22 at the VSM 16 into one or more groups (i.e., subgroups of group of VEMs in the distributed virtual switch). Each VEM group is associated with a policy (behavior, operation) as defined at database 24 at the supervisor 16 based on characteristics of the distributed virtual switch. The VEM policies may also be stored on the servers 12. As described in detail below, behavior of the distributed virtual switch 25, including for example, communication between the VSM 16 and VEMs 20, features of the virtual switch, and services running on the virtual switch, may be adapted to conform to the deployment of the VEMs. The control plane (VSM 16) and data plane (VEM 20) may be configured to make decisions to adapt the virtual switch behavior independently or collectively.

Characteristics of the distributed virtual switch 25 may include VEM group information (e.g., metrics) in combination with pre-configured or implicit higher level directives based on the groups. For example, the characteristics may include location of the VEM 20 (or VEM group) relative to the VSM 16, network characteristics, operating environment of the VEM, services or features at the VEM, or any other characteristics or combination thereof. Network information may include, for example, information identifying network connectivity between the VSM and VEM (e.g., encryption on link, reliability of connection, latency, number of hops). Operating environment information may include, for example, information about the server 12 at which the VEM 20 is located (e.g., storage capacity or processing capabilities at the server). Characteristics of the distributed virtual switch may be identified for VEMs, VEM groups, VEM to VSM communication, or any other distributed virtual switch component, interaction, or environment.

It is to be understood that the network shown in FIG. 1 and described herein is only one example and that the embodiments described herein may be implemented in networks having different network topologies and network devices, without departing from the scope of the embodiments.

Figure 2:
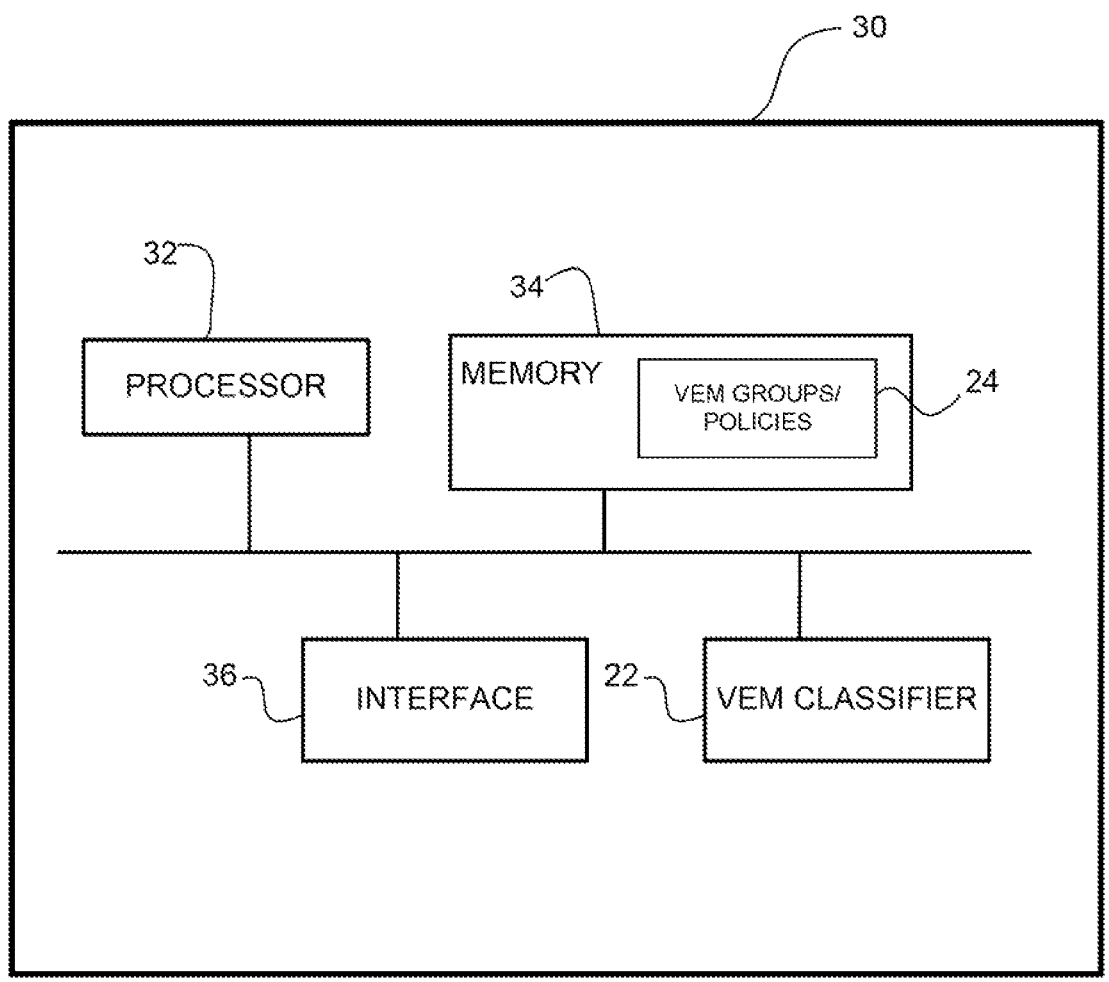
FIG. 2 depicts an example of a network device useful in implementing embodiments described herein.

An example of a network device (e.g., server, appliance) 30 that may be used to implement embodiments described herein is shown in FIG. 2. In one embodiment, network device 30 is a programmable machine that may be implemented in hardware, software, or any combination thereof. The device 30 includes one or more processor 32, memory 34, network interface 36, VEM classifier 22, and VEM groups/policies database 24.

Memory 34 may be a volatile memory or non-volatile storage, which stores various applications, modules, and data for execution and use by the processor 32. Memory 34 may include, for example, profiles (e.g., virtual switch profiles, context-aware port profiles) and a data structure 24 for storing VEM groups and policies. For example, memory 34 may include a listing of VEMs 20 and their corresponding groups, and a policy for each VEM group. Also, the VEM classifier 22 may comprise code stored in memory 34.

Logic may be encoded in one or more tangible computer readable media for execution by the processor 32. For example, the processor 32 may execute codes stored in a computer readable medium such as memory 34. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 36 may comprise one or more interfaces (linecards, ports) for receiving data or transmitting data to other devices. The interface 36 may include, for example, an Ethernet interface for connection to a computer or network.

It is to be understood that the network device 30 shown in FIG. 2 and described above is only an example and that network devices having different components and configurations may be used without departing from the scope of the embodiments. For example, the network device 30 may further include any suitable combination of hardware, software, algorithms, processors, devices, components, or elements operable to facilitate the capabilities described herein.

Figure 3:
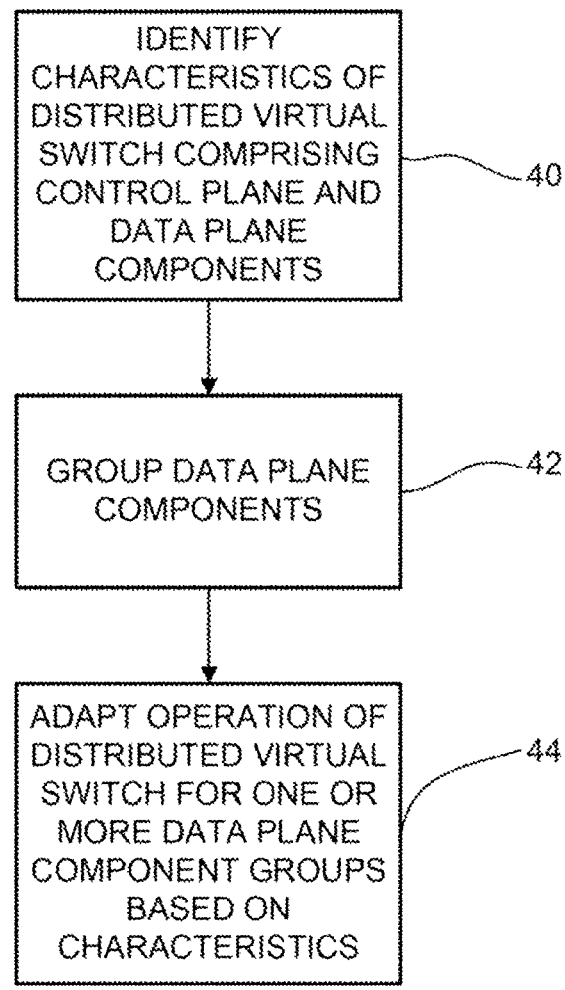
FIG. 3 is a flowchart illustrating an overview of a process for adapting operation of a distributed virtual switch based on virtual switch characteristics, in accordance with one embodiment.

FIG. 3 is a flowchart illustrating an overview of a process for providing an adaptive infrastructure for a distributed virtual switch, in accordance with one embodiment. As described above with respect to FIG. 1, the distributed virtual switch 25 includes a control plane component (VSM 16) and a plurality of data plane components (VEMs 20). At step 40, characteristics of the distributed virtual switch are identified at a network device (e.g., server hosting the VSM 16). Identifying the characteristics may comprise discovering, calculating, or looking up one or more characteristics associated with the distributed virtual switch components or operating environment. The characteristics may include, for example, metrics that are discovered or calculated at the distributed virtual switch or other information about the data plane components or interaction between the control plane and data plane components. At step 42, the distributed virtual switch 25 groups the data plane components 20 into one or more groups. As described in detail below, the data plane components 20 are grouped together based on metrics discovered or calculated at the distributed virtual switch 25. Each group may contain any number (e.g., one or more) of data plane components 20. In one embodiment, the VSM 16 collects metrics, which are used to classify the VEMs 20. The metrics may include, for example, network distance between communication points, configuration parameters, or geographic location.

Operation of the distributed virtual switch is adapted for one or more of the data plane component groups based on the identified characteristics (step 44). For example, operation of the distributed virtual switch may be different for at least two of the data plane components. In one example, group information is used in combination with preconfigured or implicit higher level directives based on the groups to define VEM to VSM communication, VEM to external services communication, or VEM behavior with respect to certain features. Behavior of the distributed virtual switch for each group of data plane components 20 is thus defined based on the characteristics of the distributed virtual switch. This allows the distributed virtual switch components to operate differently and dynamically adapt to various deployment scenarios. The control plane component 16 can change its behavior for different groups of data plane components 20 and the groups of data plane components can also operate differently from one another.

It is to be understood that the process shown in FIG. 3 is only an example and that steps may be modified, added, reordered, or combined, without departing from the scope of the embodiments. For example, the VEM groups may be defined based on collected metrics before one or more of the characteristics are identified.

As previously discussed, the VEMs 20 are classified into groups. The VEMs may be grouped heuristically in the absence of explicit user configuration. The following describes three examples of factors that may be used to group the data plane components 20. In order to provide a more accurate grouping, all three of the factors may be used to classify the data plane components 20. This may result, for example, in more than one group of VEMs located in the same data center, remote office, or public cloud.

In a first example, the VEMs 20 are grouped based on the distance between communication points in terms of network properties rather than physical distances. This metric can be calculated or calibrated periodically by a probe capable of measuring RTT (round trip time) at both communication end points. For example, traceroute or a proprietary protocol that shares observed values may be used. The probes may look at hop counts, for example. This factor may group a VEM 20 with other VEMs that are the same distance (e.g., defined by time in ms) away from the VSM even though the VEMs are geographically dispersed.

In a second example, the VEMs 20 are grouped based on configuration parameters, which may be used to identify multiple servers 12 in the same location. For example, servers 12 in a single location generally have the following configurations in common: server time-zone; storage (e.g., NFS (network file system) server IP address); management IP address domain lookup (e.g., sjc.cisco.com, rtp.cisco.com); gateway IP address; configuration in virtual center for resource pools used to prevent VMware DRS (distributed resource scheduler) from moving workload across a data center interconnect link automatically; CDP (Cisco Discovery Protocol) neighbors for a VEM; STP (spanning tree protocol) root bridge as seen in BPDUs (bridge protocol data units) by the VEM; and configuration in cloud VEM (cVEM). Knowledge that the VEM is a cVEM may be based on an image installed on the VEM and the fact that multiple such cVEMs are talking to a particular gateway. These configuration properties may be defined in host/server profiles. Any combination of the above or other configuration parameters may be used to identify the servers (and associated VEMs) that can be grouped together.

In a third example, the grouping is based on the actual geographic location. Based on public IP addresses discovered by the VEMs 20, the following information can be used: location information in DNS (Domain Name System) systems (e.g., IETF RFC 1876, "A Means for Expressing Location Information in the Domain Name System", C. Davis et al., January 1996); and geo-location/tracing public IPs discovered back to ISP (Internet Service Provider) databases to identify a general geographic location. With things such as LISP (Locator Identifier Separation Protocol), while the EIDs (Endpoint IDs) might belong to a range assigned to an ISP in another location, is it the RLOC(s) (routing locator(s)) that is needed for learning more about the geographic location.

It is to be understood that the factors described above for use in classifying the VEMs 20 are only examples and that any combination of these or other factors and metrics may be used to group the VEMs.

The data used to classify the VEMs 20 may be collected at any interval and metrics calculated periodically. The VEM groups may be updated at regular intervals or upon occurrence of an event.

Once the VEMs 20 are classified into groups, one or more characteristics may be used to adapt the behavior of the distributed virtual switch 25. The following are examples of changes that can be made to the distributed virtual switch behavior based on different identified characteristics.

In one example, a different communication mechanism may be used between the VSM 16 and VEM 20 (or VEM group). For example, with the VSM 16 managing some remote VEMs 20 in a different physical data center (e.g., connected over a link provided by a service provider), control data exchanged between the VEMs and VSM can be encrypted as opposed to being sent unencrypted or encrypted with a weaker cipher as may be done for a VEM located in the same data center as the VSM.

In another example, certain aspects of a feature may be selected to run, stop, or behave differently. For example, network traffic information (e.g., NetFlow data) collected at the VEM 20 can be exported to a different destination (collector), exported at a slower rate (buffering on the transmit side), or compressed using a compression algorithm based on the identified characteristics.

In another example, timer sensitivity may be increased or decreased. For example, with regard to module insert sequences, insert times may be slowed down for a remote VEM 20 connected via a more lossy link or located at a distant destination, whereas for local VEMs, timers may be different, speeding along the processing and response times to user actions for those VEMs. Similarly, for configuration propagation, the VSM 16 may have different timers for different groups of VEMs 20.

The differentiating behavior may also be in the form of adaptive run time decisions to tradeoff between communication and storage overheads. For example, if storage is available, the VEM 20 can cache more data and deliver all the data at one time rather than making multiple smaller and more timely deliveries of data for NetFlow or other logging or monitoring services. Also, there may be a tradeoff between varied computation complexities. For example, the distributed virtual switch may use compression and incur the additional computation overhead if the underlying link between the VSM 16 and VEM 20 is encrypted. The timer values may also be adjusted for various timeouts in the system or the distributed virtual switch may run some services or features in a limited manner (or not at all) on certain VEMs 20.

It is to be understood that the behaviors described above are only examples and that other operations at the data plane components or interactions between the data plane components and the control plane component for each group of data plane components may be adapted based on distributed virtual switch characteristics.

The adaptive behavior (policy) may be defined, for example, at a virtual switch profile or port profile. The profile is a container used to define a common set of configuration policies (attributes, features, rules) for multiple VEMs or interfaces. The profiles are associated with configuration policies defined by a network administrator and applied automatically to a large number of virtual switches or ports as they come online in a virtual environment. In one embodiment, virtual switch profiles are used to map VEM behavior to a group of VEMs based on the identified distributed virtual switch characteristics. The virtual switch profile may be associated with a port profile (context-aware profile, dynamic profile).

The metrics chosen to classify VEMs 20 or characteristics chosen to adapt behavior may also be feature specific and additional user configuration may be provided to not perform any adaptive behavior if necessary, in which case the VEM and VSM (with respect to the VEM) behave in a default predefined manner. Port profiles may be used for this purpose.

Figure 4:
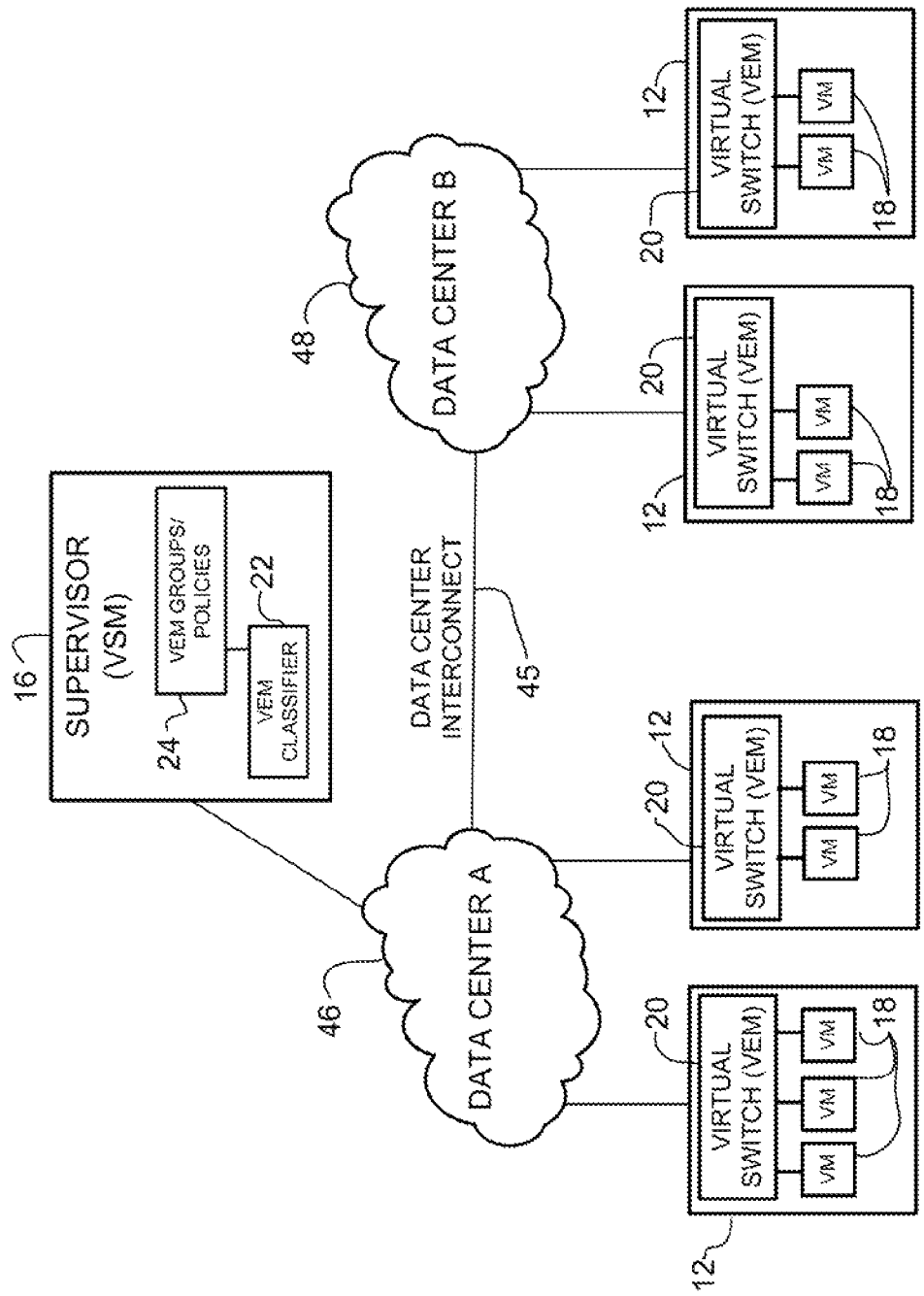
FIG. 4 illustrates an example of the distributed virtual switch deployed across different data centers.
Figure 5:
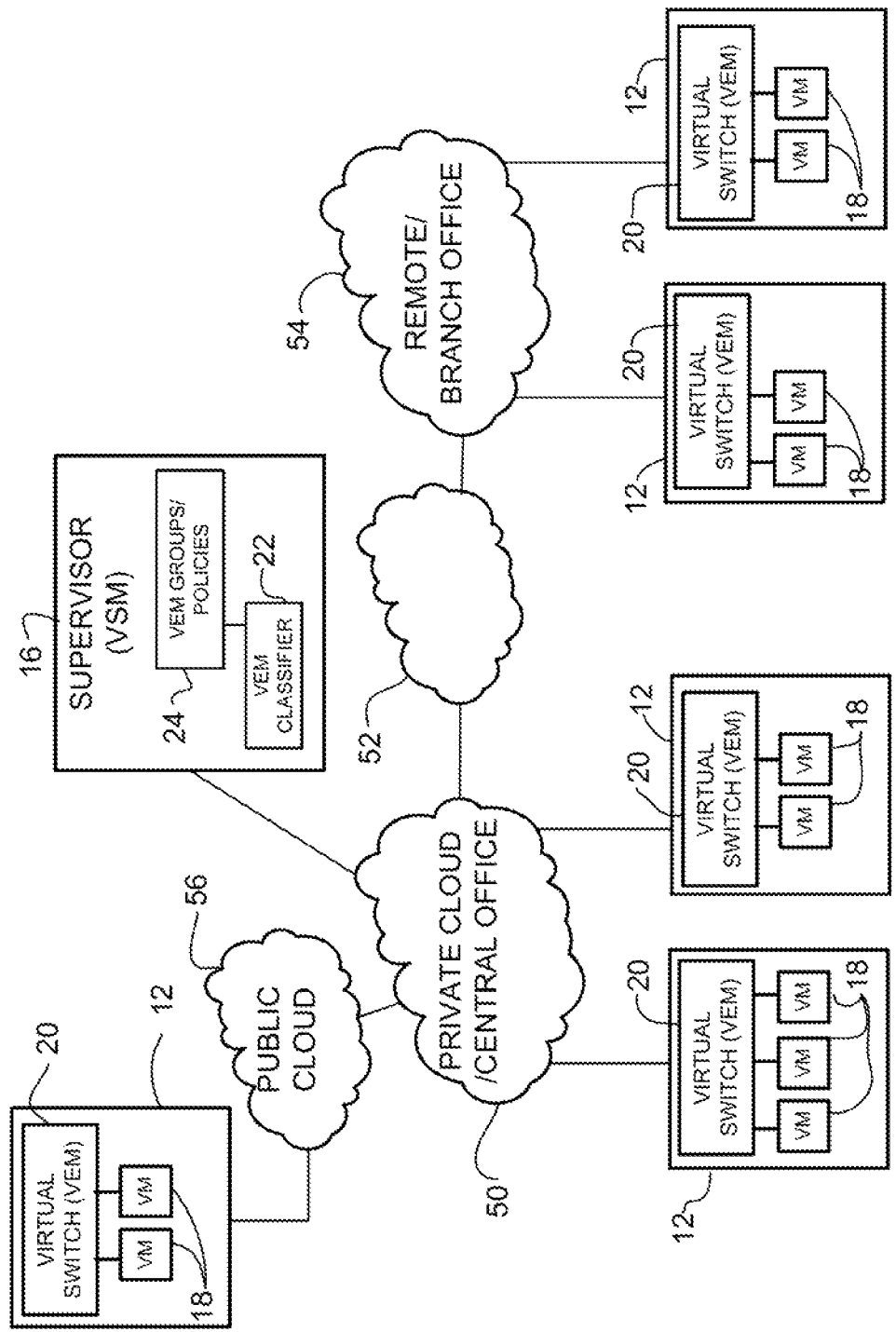
FIG. 5 illustrates an example of the distributed virtual switch deployed across different networks.

As described above, there are many different deployment scenarios for the distributed virtual switch 25. FIGS. 4 and 5 illustrate some examples of different deployment models.

FIG. 4 illustrates deployment of the distributed virtual switch 25 across different data centers (data center A 46 and data center B 48) connected through a data center interconnect link 45, which may span one or more networks (not shown). The control plane component 16 is located at data center A and communicates with data plane components 20 at data center B through the data center interconnect 45. In this example, the VEMs 20 may be grouped into two groups of data plane components; one group comprising the VEMs at data center A and the other group comprising the VEMs at data center B. The embodiments described herein may be used to adapt behavior of the distributed virtual switch so that different communication mechanisms can be used between the VSM 16 and VEMs 20 located at the same data center (data center A) and the VSM and VEMs located at a different data center (data center B).

FIG. 5 illustrates deployment of the distributed virtual switch at different networks (e.g., central location and remote office, hybrid cloud). For example, the VSM 16 and one or more VEMs 20 may be located at a central office 50, and one or more VEMs located at a remote/branch office 54. There may be one or more networks 52 (e.g., local area network, wireless local area network, cellular network, metropolitan area network, wide area network, satellite network, Internet, intranet, radio access network, public switched network, virtual private network, or any other network or combination thereof) located between the central office 50 and remote/branch office 54. Operation of the distributed virtual switch may be adapted to account for differences in network connectivity between the VSM 16 and VEMs 20 at the central office 50, and the VSM and VEMs at the remote/branch office 54.

The distributed virtual switch may also operate in a hybrid cloud environment in which the VSM 16 operates at private cloud 50 and one or more data plane components (cloud VEMs) 20 operate at a public cloud 56. There may also be any number of networks or network devices located between the private cloud 50 and public cloud 56. The cloud VEM 20 may be physically far from the enterprise location at which the VSM 16 is located, in which case operation of the VEM may be adapted to account for the increased distance over which the VEM to VSM communications need to travel. The VSM 16 at the private cloud 50 may also adapt its behavior for communications transmitted to the VEM 20 at the public cloud.

In another example, one or more VEMs 20 may be deployed using virtual extensible local area network segments (VXLANs) and may be spread across racks in the data center, potentially L3 hops away from one another and the VSM 16.

It is to be understood that the distributed virtual switch deployment models shown in FIGS. 1, 4, and 5 and described herein are only examples and that the embodiments described herein may operate in environments different than those shown.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    identifying at a network device, characteristics of a distributed virtual switch comprising a control plane component and a plurality of data plane components comprising virtual switches, wherein said characteristics comprise location of said data plane components relative to the control plane component, network connectivity between said data plane components and the control plane component, and operating environment comprising configuration of servers at which data plane components are operating;

grouping said data plane components based on one or more of said characteristics, wherein each of said groups is associated with a policy defined in a database at the distributed virtual switch based on said characteristics; and dynamically adapting operation of the control plane component of the distributed virtual switch for one or more groups of said data plane components based on one or more of said characteristics, wherein a behavior of the control plane component is different for at least two groups of said data plane components, wherein dynamically adapting operation comprises adapting communication between the control plane component and said data plane components and modifying features of said data plane components.

2. The method of claim 1 wherein grouping said data plane components comprises collecting metrics for said data plane components and classifying said data plane components based on said metrics.

3. The method of claim 2 wherein said metrics comprise network distances between said data plane components and said control plane component.

4. The method of claim 2 wherein said metrics comprise configuration parameters for said data plane components.

5. The method of claim 4 wherein said configuration parameters comprise configuration parameters for a server operating said data plane component, and wherein said configuration parameters are used to identify a geographic location.

6. The method of claim 2 wherein said metrics comprise geographic locations.

7. The method of claim 2 wherein said characteristics comprise one or more of said metrics.

8. The method of claim 1 wherein adapting communication comprises encrypting data exchanged between said control plane component and said data plane components.

9. The method of claim 1 wherein adapting operation of the distributed virtual switch comprises modifying timers at one or more of said distributed virtual switch components.

10. An apparatus comprising:
a processor configured to identify characteristics of a distributed virtual switch comprising a control plane component and a plurality of data plane components comprising virtual switches, grouping said data plane components based on one or more of said characteristics, and dynamically adapting operation of the control plane component of the distributed virtual switch for one or more groups of said data plane components based on one or more of said characteristics; and memory configured to store a policy defining said operation for each of said data plane component groups;

wherein said characteristics comprise location of said data plane components relative to the control plane component, network connectivity between said data plane components and the control plane component, and operating environment comprising configuration of servers at which data plane components are operating;

wherein each of said groups is associated with a policy defined in a database at the distributed virtual switch based on said characteristics; and wherein a behavior of the control plane component is different for at least two groups of said data plane components; and wherein dynamically adapting operation comprises adapting communication between the control plane component and said data plane components and modifying features of said data plane components.

11. The apparatus of claim 10 wherein grouping said data plane components comprises collecting metrics for said data plane components and classifying said data plane components based on said metrics.

12. The apparatus of claim 11 wherein said metrics comprise network distances between said data plane components and said control plane component.

13. The apparatus of claim 11 wherein said metrics comprise configuration parameters for said data plane components.

14. The apparatus of claim 13 wherein said configuration parameters comprise configuration parameters for a server operating said data plane component, and wherein said configuration parameters are used to identify a geographic location.

15. The apparatus of claim 11 wherein said metrics comprise geographic locations.

16. Logic encoded on one or more non-transitory computer readable media for execution by a processor and which, when executed causes:
identifying characteristics of a distributed virtual switch;
grouping said data plane components based on one or more of said characteristics;
dynamically adapting operation of the control plane component of the distributed virtual switch for one or more groups of said data plane components based on one or more of said characteristics, wherein a behavior of the control plane component is different between at least two groups of said data plane components, dynamically adapting operation comprises adapting communication between the control plane component and said data plane components and modifying features of said data plane components;
group said data plane components based on one or more of said characteristics, wherein each of said groups is associated with a policy defined in a database at the distributed virtual switch based on said characteristics; and
dynamically adapt operation of the control plane component of the distributed virtual switch for one or more groups of said data plane components based on one or more of said characteristics, wherein a behavior of the control plane component is different between at least two groups of said data plane components, dynamically adapting operation comprises adapting communication between the control plane component and said data plane components or modifying features of said data plane components;
wherein said characteristics comprise location of said data plane components relative to the control plane component, network connectivity between said data plane components and the control plane component, and operating environment comprising configuration of servers at which data plane components are operating.

17. The logic of claim 16 wherein grouping said data plane components comprises collecting metrics for said data plane components and classifying said data plane components based on said metrics.

18. The logic of claim 17 wherein said metrics comprise network distances between said data plane components and said control plane component.

19. The logic of claim 17 wherein said metrics comprise configuration parameters for said data plane components.

20. The logic of claim 17 wherein said metrics comprise geographic locations.

\* \* \* \* \*